(12) United States Patent
Teggatz et al.

(10) Patent No.: US 11,139,860 B2
(45) Date of Patent: *Oct. 5, 2021

(54) RESONANT CIRCUIT DYNAMIC OPTIMIZATION SYSTEM AND METHOD

(71) Applicant: TRIUNE IP LLC, Plano, TX (US)

(72) Inventors: Ross E. Teggatz, The Colony, TX (US); Jonathan Knight, Yokohama (JP); Patrick Kawamura, Fairview, TX (US); Wayne T. Chen, Plano, TX (US)

(73) Assignee: TRIUNE IP LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,642

(22) Filed: Jun. 22, 2020

(65) Prior Publication Data

US 2020/0322004 A1    Oct. 8, 2020

Related U.S. Application Data

(63) Continuation of application No. 13/851,892, filed on Mar. 27, 2013, now Pat. No. 10,693,525.

(60) Provisional application No. 61/616,101, filed on Mar. 27, 2012.

(51) Int. Cl.
| | |
|---|---|
| *H04B 5/00* | (2006.01) |
| *H01Q 1/50* | (2006.01) |
| *H01Q 3/24* | (2006.01) |
| *H01Q 3/02* | (2006.01) |
| *H01Q 7/00* | (2006.01) |
| *H01Q 21/28* | (2006.01) |

(52) U.S. Cl.
CPC .............. *H04B 5/0037* (2013.01); *H01Q 1/50* (2013.01); *H01Q 3/02* (2013.01); *H01Q 3/24* (2013.01); *H01Q 7/00* (2013.01); *H01Q 21/28* (2013.01); *H04B 5/0087* (2013.01)

(58) Field of Classification Search
CPC ...... H04B 5/0037; H04B 5/0087; H01Q 1/50; H01Q 3/02; H01Q 3/24; H01Q 7/00; H01Q 21/28
See application file for complete search history.

(56) References Cited

U.S. PATENT DOCUMENTS

| | | | |
|---|---|---|---|
| 2007/0296548 A1 | 12/2007 | Hall | H03J 1/0008 340/10.1 |
| 2007/0296593 A1 | 12/2007 | Hall | G06K 19/0723 340/572.7 |
| 2010/0036773 A1 | 2/2010 | Bennett | G06Q 20/3674 705/67 |
| 2010/0148723 A1 | 6/2010 | Cook | G06K 7/0008 320/108 |
| 2011/0175455 A1 | 7/2011 | Hashiguchi | H02J 17/00 307/104 |

(Continued)

*Primary Examiner* — Daniel Kessie
(74) *Attorney, Agent, or Firm* — Jackson Walker LLP; Christopher J. Rourk

(57) ABSTRACT

A resonant circuit dynamic optimization system is described herein that can exhibit improved system charging functionality, can have multi-input charging functionality, and can improve the efficiency and speed of charging electronic devices. The resonant circuit dynamic optimization system can comprise at least one antenna configured to receive or transmit an electromagnetic signal, at least one variable component, and at least one dynamic adjustment circuit. The dynamic adjustment circuit can adjust the variable component to thereby modify the power transfer efficiency of the electromagnetic signal.

20 Claims, 8 Drawing Sheets

(56) References Cited

U.S. PATENT DOCUMENTS

2012/0248889 A1    10/2012    Fukushi ................ H02J 17/00
                                                                    307/104
2012/0262002 A1    10/2012    Widmer ................ H02J 7/025
                                                                    307/104

RESONANT CIRCUIT DYNAMIC OPTIMIZATION SYSTEM AND METHOD

PRIORITY ENTITLEMENT

This non-provisional application is a continuation of U.S. patent application Ser. No. 13/851,892 filed Mar. 27, 2013, which claims benefit of U.S. Provisional Application Ser. No. 61/616,101, filed Mar. 27, 2012, which is hereby incorporated by reference for all purposes as if set forth herein in its entirety.

TECHNICAL FIELD

The disclosure relates generally to storage device charging systems. More particularly, the disclosure relates to a system and method for optimizing the charging of storage devices.

BACKGROUND

Inductive resonance has been used to transfer energy in free space. Such systems commonly utilize a resonant circuit to transfer the energy for charging. When energy is stimulated at the frequency of the resonant circuit, the output of the resonant circuit may amplify the energy, provided that the impedance is kept at a low enough level. As the impedance reduces in the resonant circuit, the gain also reduces. The quality (Q) of the resonant circuit is dependent upon its inductance (L), capacitance (C), and resistance (R). Various issues associated with inductive resonance include changing loads caused by changing positions of the antenna in the system and changes in the impedance of the circuit.

Although advances have been made in the field of charging electronic devices, improvements are still needed to enhance existing charging systems.

SUMMARY

In one embodiment of the present invention, a resonant circuit dynamic optimization system is provided. The system comprises at least one antenna configured to receive or transmit at least one electromagnetic signal; at least one variable component operatively coupled to the antenna and that is configured to modify the power transfer efficiency of the electromagnetic signal; and at least one dynamic adjustment circuit operatively coupled to the variable component. In this embodiment, the variable component is configured to be responsive to said dynamic adjustment circuit.

In another embodiment of the present invention, a resonant circuit dynamic optimization system is provided. The system comprises an intermediate antenna configured to receive or transmit at least one electromagnetic signal; an intermediate variable component operatively coupled to the intermediate antenna and configured to modify the power transfer efficiency of the electromagnetic signal; an intermediate dynamic adjustment circuit operatively coupled to the intermediate variable component, wherein the intermediate variable component is configured to be responsive to the intermediate dynamic adjustment circuit; at least one secondary antenna configured to receive the electromagnetic signal; a secondary variable component operatively coupled to the secondary antenna and configured to modify the power transfer efficiency of the electromagnetic signal; and a secondary dynamic adjustment circuit operatively coupled to the secondary variable component, wherein the secondary variable component is configured to be responsive to the secondary intermediate dynamic adjustment circuit.

In yet another embodiment of the present invention, a resonant circuit dynamic optimization system is provided. The system comprises at least one dynamic adjustment circuit; at least one antenna operatively coupled to the dynamic adjustment circuit and configured to communicate at least one electromagnetic signal to the dynamic adjustment circuit; and at least one variable component operatively coupled to the dynamic adjustment circuit and configured to communicate an adjustment signal from the dynamic adjustment circuit.

In still yet another embodiment of the present invention, a method for resonant circuit dynamic optimization system is provided. The method comprises (a) receiving at least one electromagnetic signal; (b) determining a power transfer efficiency of the electromagnetic signal with a dynamic adjustment circuit; and (c) modifying the power transfer efficiency with at least one variable component.

BRIEF DESCRIPTION OF THE DRAWINGS

The present disclosure will be more clearly understood from consideration of the following detailed description and drawings in which.

Figure 1:
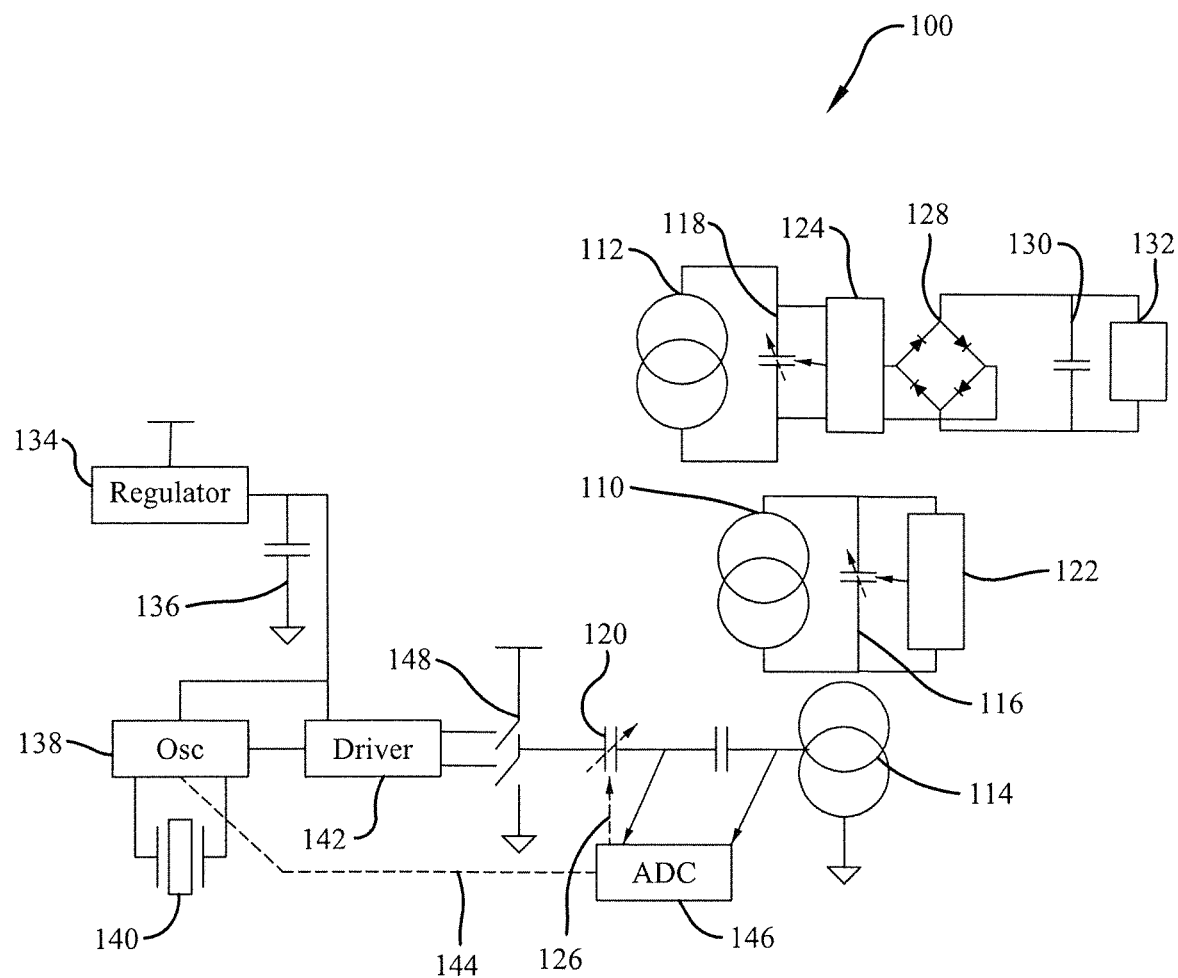
FIG. 1 depicts one embodiment of a resonant circuit dynamic optimization system.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the disclosure unless specifically noted. The drawings are not to scale, and some features of examples shown and discussed are simplified or amplified for illustrating principles and features as well as advantages of the disclosure.

DETAILED DESCRIPTION

The system described herein can exhibit improved system charging functionality, can have multi-input charging functionality, and can improve the efficiency and speed of charging electronic devices. In one or more embodiments described herein, the system utilizes a control algorithm in conjunction with inductive resonant circuits to optimize the energy being transferred, propagated, and directed to a final load. In one embodiment, this may be achieved by providing a control loop at any stage of the inductive resonant coupling system. In another embodiment, the system may comprise an analog to digital converter at the driver for monitoring the energy that is being driven to the resonant driving circuit.

In various embodiments, part of the system may comprise an antenna which may act as an inductor, a resistor, and a capacitor. In such embodiments, the inductor, resistor, and capacitor of the antenna may comprise the resonant circuit at the driver. In certain embodiments, the capacitor value may be adjusted to optimize the transfer of energy in the system. In one or more embodiments, the inductor value, the capacitive value, the resistor value, the switching frequency of the driver, or a combination of these within the system can be adjusted. In one embodiment, the system can comprise an energy monitoring circuit at the driver for evaluating the energy transfer and adjusting a variable component that has an effect on resonance, such as capacitance. Likewise, a similar approach may be utilized at the load to maximize energy transfer. For example, the system can comprise a monitoring circuit at the load for evaluating and adjusting energy transfer and for providing adjustments to another variable component that has an effect on resonance, such as capacitance.

In various embodiments, the variable component may comprise an adjustable inductor, a variable capacitor, a variable resistor, a variable antenna configuration, a variable antenna array, or a combination thereof. A variable inductor can include, for example, an adjustable inductance antenna. Furthermore, the variable antenna configuration can include, for example, a dynamically steerable antenna, a plurality of switchable antennas, or combinations thereof. The dynamically steerable antenna may be motor controlled or transducer controlled so as to facilitate the adjustment of the spatial position of the antenna.

In addition to changing the inductive value, different antenna configurations may be dynamically utilized in the system to help maximize energy propagation. In one or more embodiments, this can be achieved by switching between different antennas which may be differently shaped or oriented. In one embodiment, it is envisioned that the antennas may also be steered dynamically to configure them for optimal energy transfer. In various embodiments, the dynamic control variables, frequency, and passive values at any stage may be monitored and controlled by respective dynamic adjustment circuits.

In one or more embodiments, the system may comprise a wireless configuration for handshaking through the inductive resonant coupling system in order to communicate throughout the system. In such embodiments, the wireless configuration may use high or low frequency communication links such as, for example, ZigBee, WiFi, Bluetooth, or the like. In addition to these wireless communications, the inductive resonance system may use the system itself as a communication network. In various embodiments, communication links from one entity (e.g., the driver, propagation point, or load) to another entity in the system may be achieved by altering the frequency, impedance, capacitance, resistance, and the like. In certain embodiments, the communication links may be uni-directional, bi-directional, or a combination thereof. In one embodiment, the communication links may be accomplished via a wired or opto-coupling.

In one or more embodiments, the system may comprise an inductive wireless power pack that a person can carry. In such embodiments, the wireless power pack can function as the driving device. In one embodiment, the driving device may be configured within jewelry such as, for example, a necklace or bracelet. In various embodiments, a load from such an application may be utilized for hearing aids, watches, electronic eyeglasses, transcutaneous electrical nerve simulation unit, pace makers, and the like. The system may also be utilized for non-local applications, which may include, for example, wireless speakers, smart grid applications, and the like.

It should be noted that any of the above concepts and embodiments may be combined and utilized as long they are compatible. In certain embodiments, control of the system may be placed at one or more of the inductive resonant circuit links. Furthermore, in various embodiments, one or more drivers, propagating nodes, and loading nodes may be used in the system. In one embodiment, combinations of frequencies may also be utilized in the system.

The features and other details of the disclosure will now be more particularly described with reference to the accompanying drawings, in which various illustrative examples of the disclosed subject matter are shown and/or described. It will be understood that particular examples described herein are shown by way of illustration and not as limitations of the disclosure. The disclosed subject matter should not be construed or limited to any of the examples set forth herein. These examples are provided so that this disclosure will be thorough and complete, and will fully convey the scope of the disclosed subject matter to those skilled in the art. The principle features of this disclosure can be employed in various examples while remaining within the scope of the disclosure.

The terminology used herein is for the purpose of describing particular examples and is not intended to be limiting of the disclosed subject matter. Like number refer to like elements throughout. As used herein the term "and/or" includes any combination of one or more of the associated listed items. Also, as used herein, the singular forms "a", "an", and "the" are intended to include the plural forms as well, unless the context clearly indicates otherwise. It will be further understood that the terms "comprises", and/or "comprising" when used in this specification, specify the presence of stated features, integers, steps, operations, elements, and/or components, but do not preclude the presence or addition of one or more other features, integers, steps, operations, elements, components, and/or groups thereof. Also, as used herein, relational terms such as first and second, top and bottom, left and right, and the like may be used solely to distinguish one entity or action from another entity or action without necessarily requiring or implying any actual such relationship or order between such entities or actions.

FIG. 1 depicts a resonant circuit dynamic optimization system 100 comprising of multiple stages and that comprises an antenna 110, an intermediate antenna 112, and a receiving antenna 114 configured to transmit and/or receive electromagnetic signals, variable components 116, 118, and 120 operatively coupled to the antennas, and dynamic adjustment circuits 122, 124, and 126 operatively coupled to the variable components. A magnetic signal can be propagated by this system and can be referred to as the "energy waveguide." Each of the antennas 110, 112, and 114 can capture the energy waveguide and/or assist in propagating the energy waveguide by modifying an antenna interaction parameter, which can be controlled by tuning and detuning the resonance of each antenna. The antenna interaction parameter at least partially affects the resonance of the circuits 122, 124, and 126, for example, by modifying the inductance, capacitance, or resistance of the circuits, by modifying the number of antennas or direction of the antennas in the system, and/or by modifying the amplitude or frequency of the electromagnetic signals. The dynamic adjustment circuits 122, 124, and 126 can adjust the variable components 116, 118, and 120 to thereby modify the power transfer efficiency of the electromagnetic signals. The variable components 116, 118, and 120 are responsive to the dynamic adjustment circuits 122, 124, and 126. The variable components 116, 118, and 120 in this embodiment are variable capacitors. In this particular embodiment, one or more intermediate loads may be utilized to assist in the energy waveguide propagation.

As shown in FIG. 1, the dynamic adjustment circuits 122, 124, and 126 can determine the power transfer efficiency of the electromagnetic signals. The system further comprises at least one rectifier 128, at least one power capacitor 130, and a load 132 operatively coupled to the dynamic adjustment circuit 124. The rectifier 128 may be a full bridge, half bridge, passive, and/or active. If the rectifier 128 is active, then it may be fully synchronous, a half synchronous bridge, or dynamically adjusted to be fully synchronous, half synchronous, or asynchronous.

The dynamic adjustment circuit 126 may comprise a regulator 134 tied to the bridge circuit through an input capacitor 136. The regulator 134 may be linear and/or switching. An oscillator 138 having a crystal 140 is electrically connected to a synchronous MOSFET driver 142. A feedback 144 is electrically connected from an analog to digital converter 146 to the oscillator. The feedback circuit 126 may be connected from the analog to digital converter to an adjustable capacitor 120. In alternative embodiments not depicted herein, the circuit may comprise no feedbacks or may utilize one or more feedbacks. A pair of switches 148 connects the synchronous MOSFET driver 142 to the adjustable capacitor 120.

Figure 2:
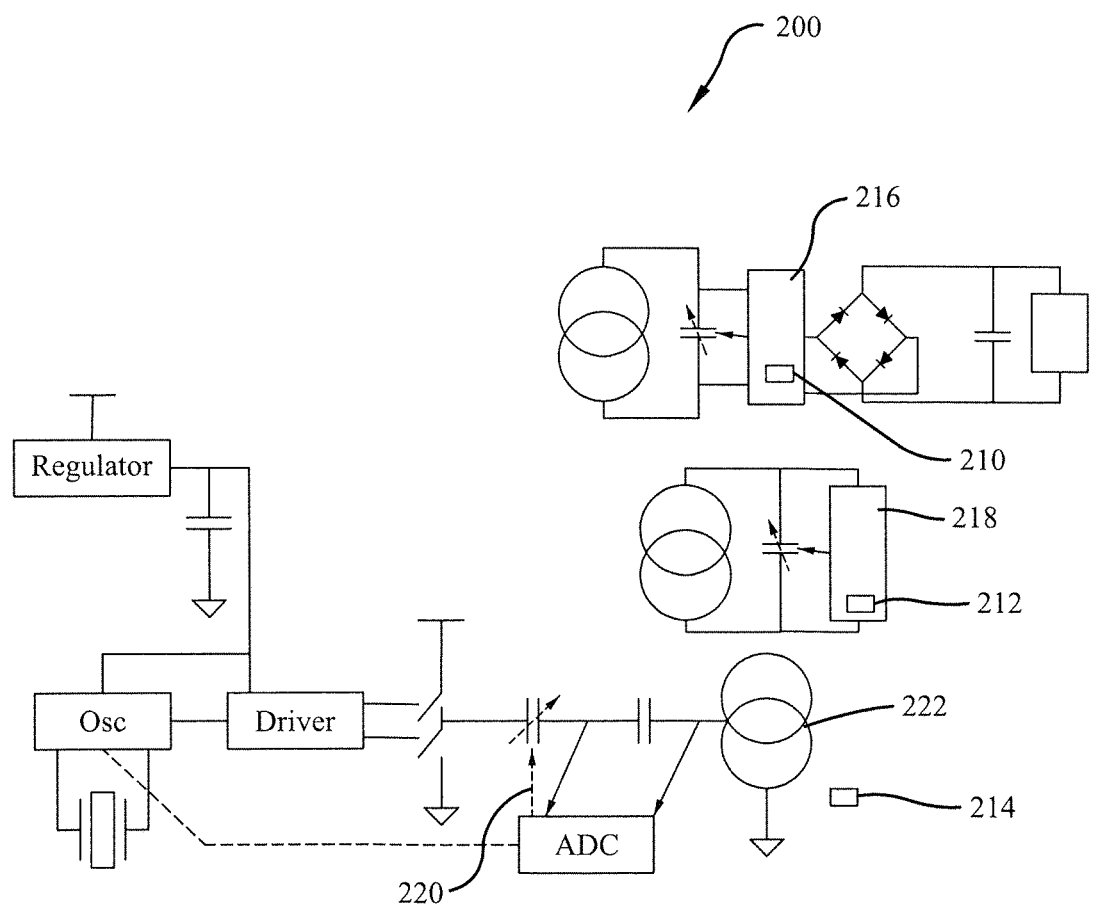
FIG. 2 depicts one embodiment of a resonant circuit dynamic optimization system.

FIG. 2 shows a resonant circuit dynamic optimization system 200 with the same circuit configurations depicted in FIG. 1 with the addition of communication links 210, 212, and 214 operatively coupled to the dynamic adjustment circuits 216, 218, and 220. The feedback from the communication links 210, 212, and 214 may be utilized to adjust the frequency, amplitude, or resonance point of the driver antenna 222. The communication links 210, 212, and 214 are configured to receive communication signals. The communication links 210, 212, and 214 can comprise any one of the following communication configurations: a ZigBee, WiFi, wireless local area network, Bluetooth, wired, and/or opto-coupling. As shown in FIG. 2, communications link 214 is tied to the driver circuit 220, communications link 212 is tied to the intermediate dynamic adjustment circuit 218, and communications link 210 is tied to the dynamic adjustment circuit 216. The communication links 210, 212, and 214 may be used to provide spatial location, which may be used to further optimize the system control loop by adjusting the resonance of each of individual transmitter or load control loops.

Figure 3:
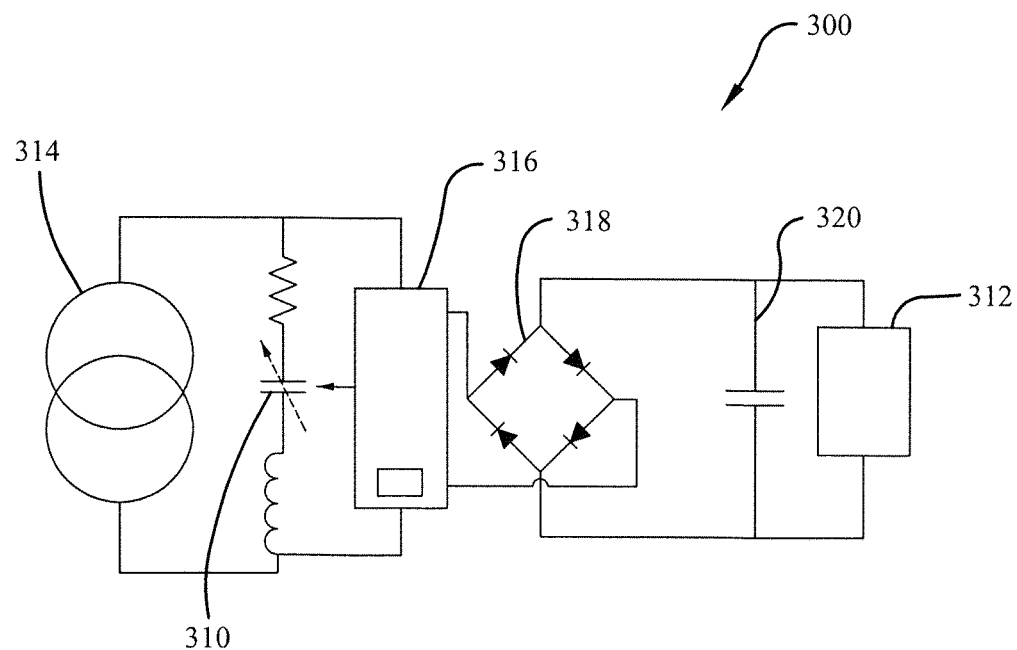
FIG. 3 depicts one embodiment of a resonant circuit dynamic optimization system having a variable capacitor.

FIG. 3 depicts a resonant circuit dynamic optimization system 300 comprising a variable component that comprises a variable capacitor 310, which may be applied to a load 312 or one or more intermediate loads. The system further comprises an antenna 314, a dynamic adjustment circuit 316, a rectifier 318, and a power capacitor 320.

Figure 4:
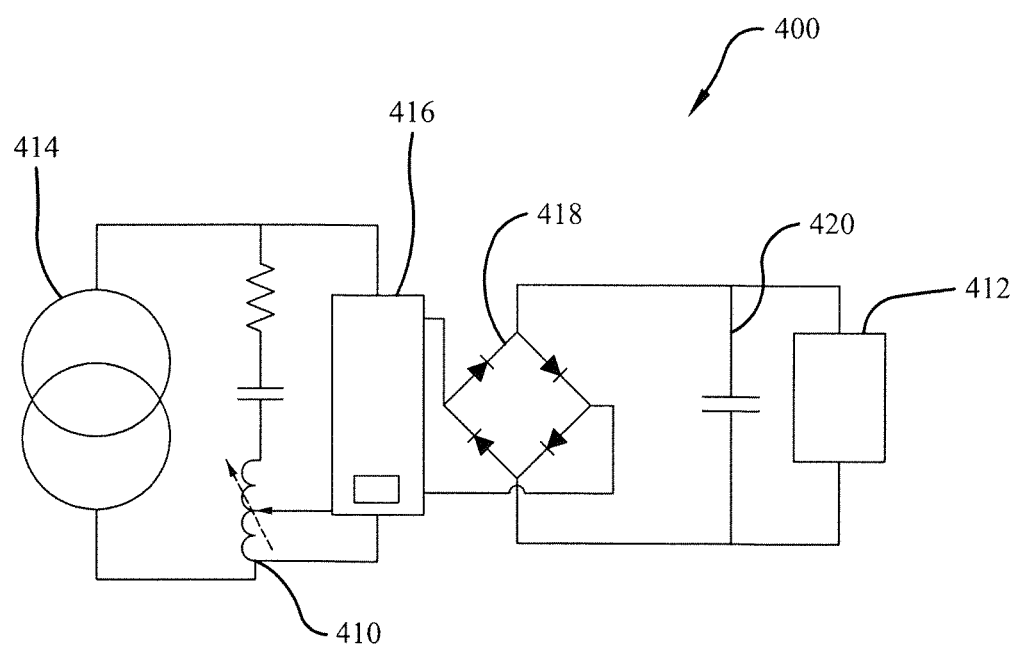
FIG. 4 depicts one embodiment of a resonant circuit dynamic optimization system having a variable inductor.

FIG. 4 depicts a resonant circuit dynamic optimization system 400 comprising a variable component that comprises a variable inductor 410, which may be applied to a load 412 or one or more intermediate loads. In this embodiment, it is envisioned that the variable inductor 410 comprises an adjustable inductance antenna. The system further comprises an antenna 414, a dynamic adjustment circuit 416, a rectifier 418, and a power capacitor 420.

Figure 5:
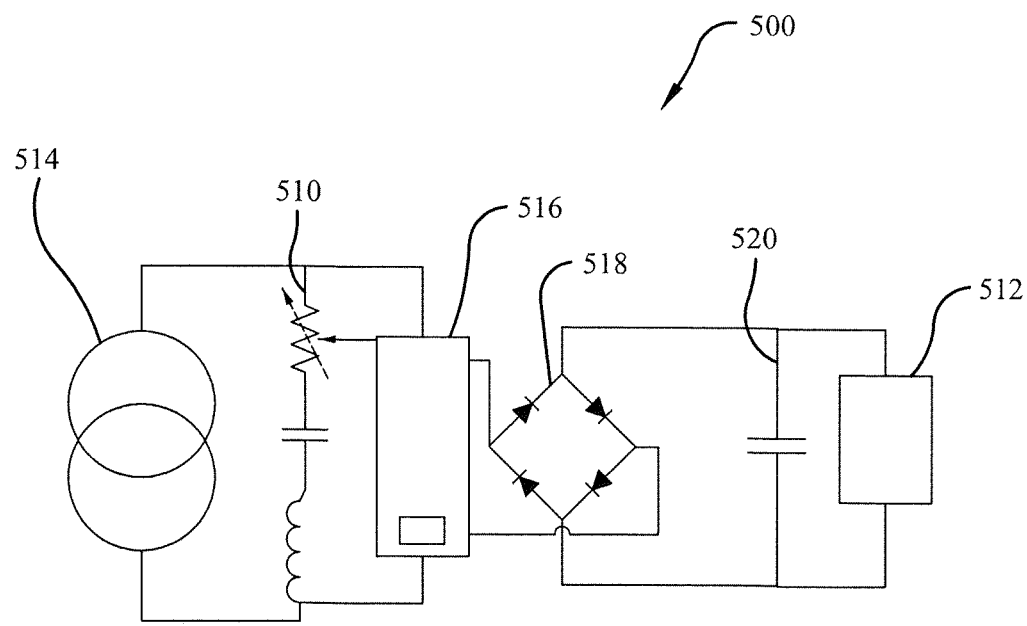
FIG. 5 depicts one embodiment of a resonant circuit dynamic optimization system having a variable resistor.

FIG. 5 depicts a resonant circuit dynamic optimization system 500 comprising a variable component that comprises a variable resistor 510, which may be applied to a load 512 or one or more intermediate loads. In this embodiment, the variable resistance may be dynamically adjusted when the load circuit is applied. Furthermore, the dynamic load adjustment may be resistive or complex. The system further comprises an antenna 514, a dynamic adjustment circuit 516, a rectifier 518, and a power capacitor 520.

Figure 6:
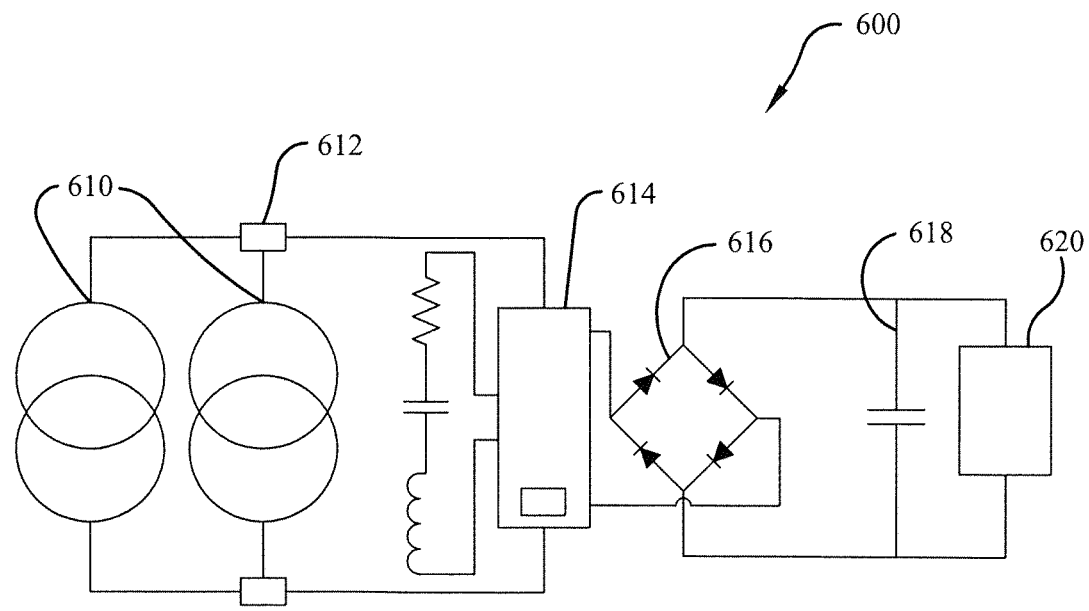
FIG. 6 depicts one embodiment of a resonant circuit dynamic optimization system having a variable antenna configuration with multiple switching antennas.

FIG. 6 depicts a resonant circuit dynamic optimization system 600 comprising a variable component that comprises a variable antenna configuration 610. Furthermore, an antenna switch 612 is operably coupled to the variable antenna configuration 610 and a dynamic adjustment circuit 614. The antenna switch 612 may be applied in series, in parallel, or in a combination of series and parallel. The system further comprises a rectifier 616, a power capacitor 618, and a load 620.

Figure 7:
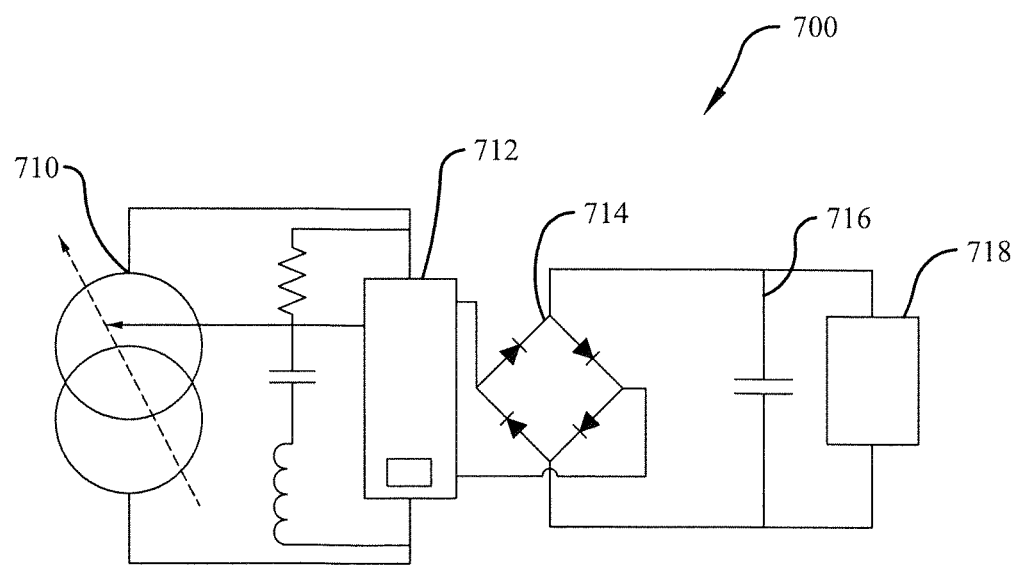
FIG. 7 depicts one embodiment of a resonant circuit dynamic optimization system having a variable antenna configuration with a steerable antenna.

FIG. 7 depicts a resonant circuit dynamic optimization system 700 comprising a variable component that comprises a variable antenna configuration in the form of a dynamically steerable antenna 710, which is operably coupled to a dynamic adjustment circuit 712. In this embodiment, the dynamically steerable antenna 710 may be motor controlled or transducer controlled so as to facilitate the adjustment of the spatial position of the antenna and thereby permit the optimization of energy waveguide capture. The system further comprises a rectifier 714, a power capacitor 716, and a load 718.

Figure 8:
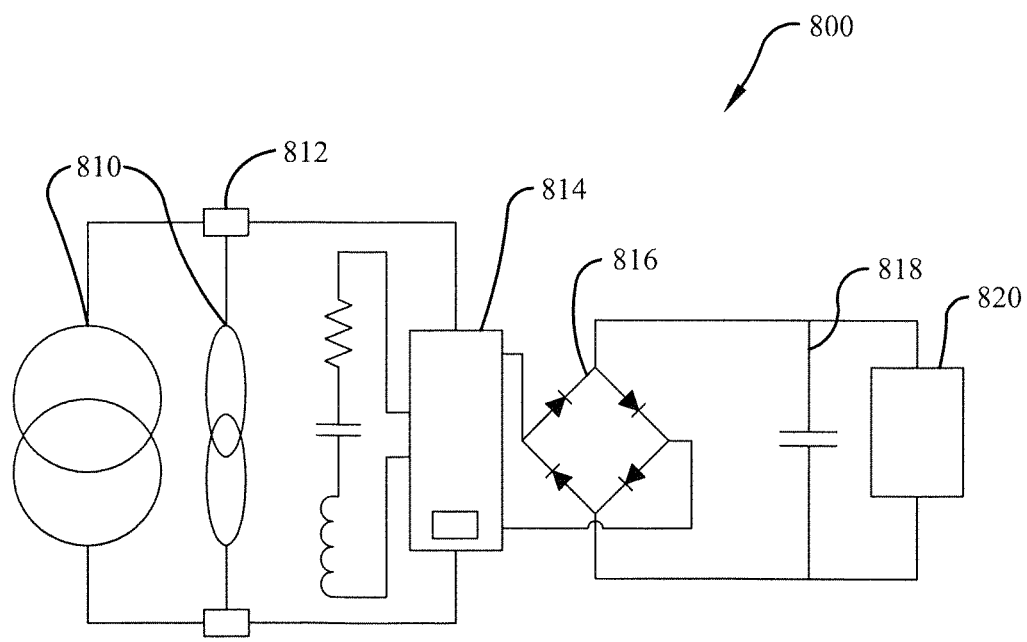
FIG. 8 depicts one embodiment of a resonant circuit dynamic optimization system having a variable antenna configuration with antennas having different orientations.

FIG. 8 depicts a resonant circuit dynamic optimization system 800 comprising a variable component that comprises a variable antenna configuration in the form of a plurality of switchable antennas 810. The plurality of switchable antennas 810 comprises two orientations and is operably connected to an antenna switch 812 and a dynamic adjustment circuit 814. In this embodiment, the variable antenna configuration may be switched into the circuit or shunted in order to remove it from the circuit, thereby providing a means to modify the energy waveguide capture. The system further comprises a rectifier 816, a power capacitor 818, and a load 820.

Figure 9:
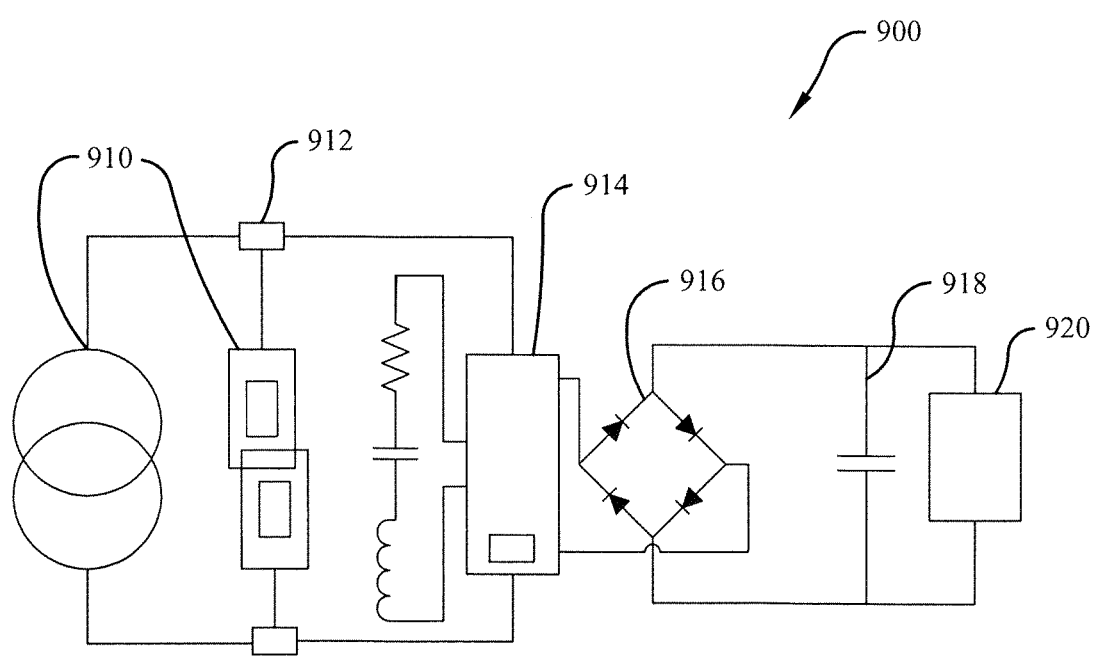
FIG. 9 depicts one embodiment of a resonant circuit dynamic optimization system having a variable antenna configuration with antennas having different shapes.

FIG. 9 depicts a resonant circuit dynamic optimization system 900 comprising a variable component that comprises a variable antenna configuration in the form of a plurality of switchable antennas 910. The plurality of switchable antennas 910 comprise at least two shapes and are operably connected to an antenna switch 912 and a dynamic adjustment circuit 914. The system further comprises a rectifier 916, a power capacitor 918, and a load 920.

Figure 10:
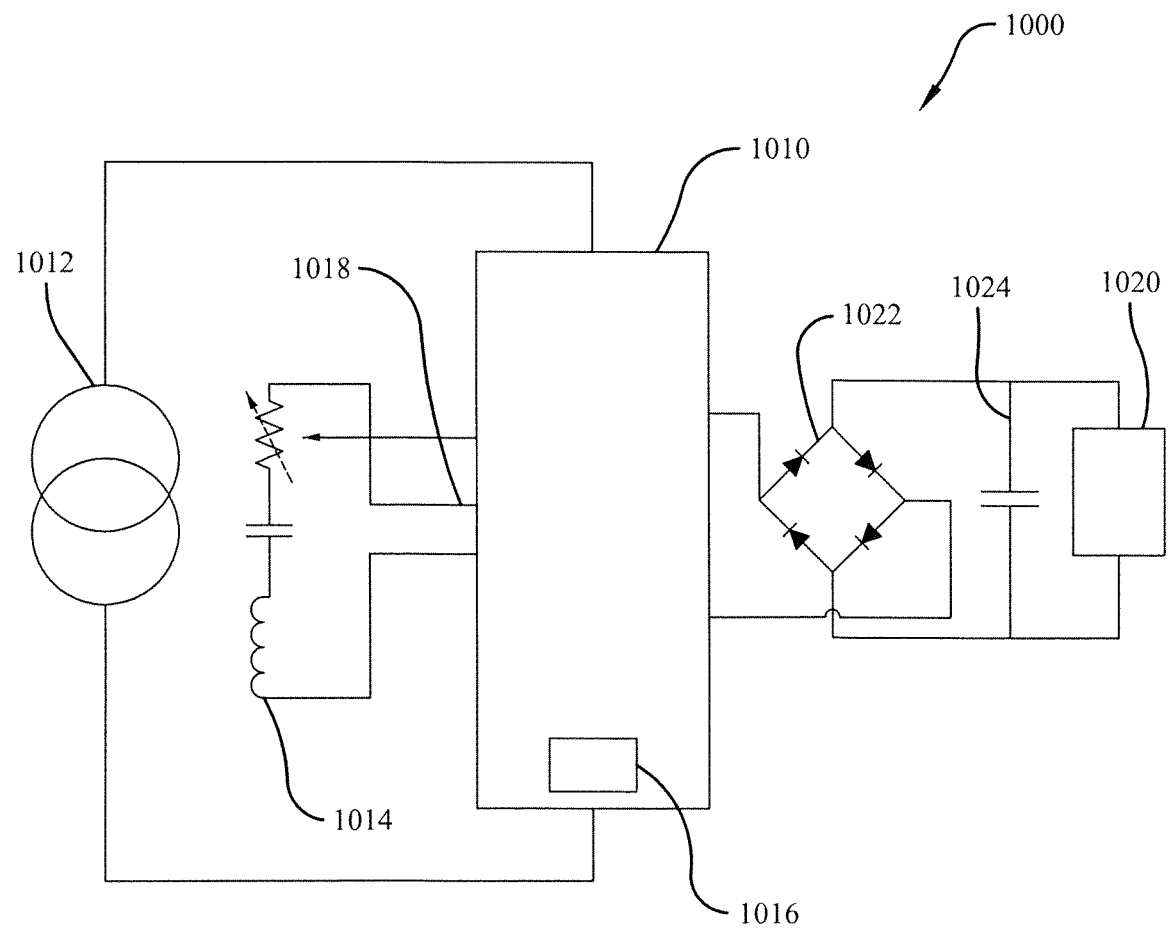
FIG. 10 depicts one embodiment of a resonant circuit dynamic optimization system having a variable resistor.

FIG. 10 depicts a resonant circuit dynamic optimization system 1000 comprising a 1010 that is operatively coupled to an antenna 1012. The antenna 1012 communicates at least one electromagnetic signal to the dynamic adjustment circuit 1010. The system also comprises a variable component 1014 operatively coupled to the dynamic adjustment circuit 1012, which communicates at least one adjustment signal from the dynamic adjustment circuit 1012. In this embodiment, the variable component 1014 is a variable capacitor.

As shown in FIG. 10, the system further comprises a communication link 1016 that is operatively coupled to the dynamic adjustment circuit 1012. The communication link 1016 communicates at least one communication signal to the dynamic adjustment circuit 1012 and can be uni-directional and/or bi-directional. The system further comprises a resonant circuit interface 1018 operatively coupled to the dynamic adjustment circuit. In addition, the system further comprises a load 1020 operatively coupled to the dynamic adjustment circuit 1012, which is capable of communicating at least one power signal to the dynamic adjustment circuit 1012. The system further comprises a rectifier 1022 and a power capacitor 1024.

Figure 11:
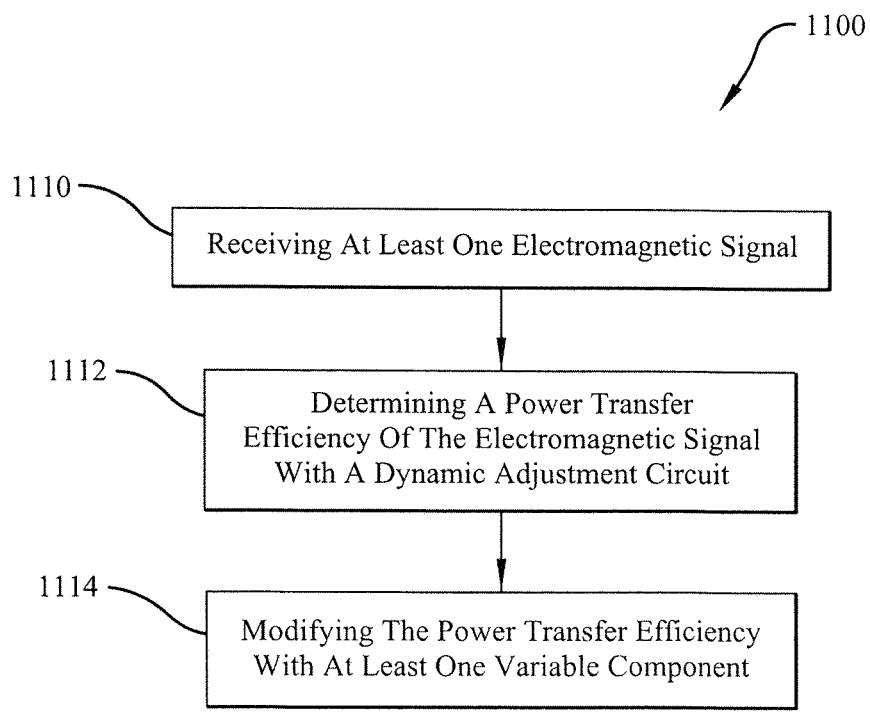
FIG. 11 depicts a method of resonant circuit dynamic optimization according to one embodiment.

FIG. 11 depicts a method of resonant circuit dynamic optimization 1100 comprising the steps of receiving 1110 at least one electromagnetic signal, determining 1112 a power transfer efficiency of the electromagnetic signal with a dynamic adjustment circuit, and modifying 1114 modifying the power transfer efficiency with at least one variable component.

Figure 12:
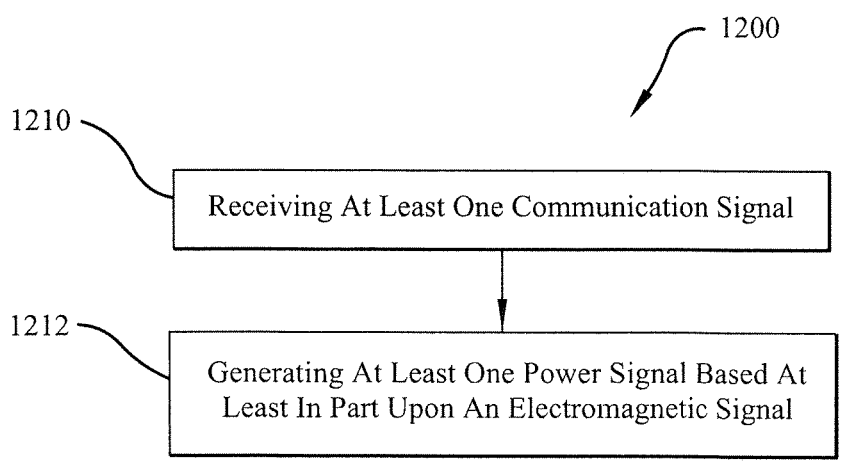
FIG. 12 depicts a method of resonant circuit dynamic optimization according to one embodiment.

The method 1200 depicted in FIG. 12 further comprises the steps of receiving 1210 at least one communication signal, which is at least partially relied on to determine a power transfer efficiency, and generating 1212 at least one power signal based at least in part upon the electromagnetic signal.

While the making and using of various exemplary examples of the disclosure are discussed herein, it is to be appreciated that the present disclosure provides concepts which can be described in a wide variety of specific contexts. It is to be understood that the device and method may be practiced with cell phones, personal digital assistants, laptop computers, tablet computers, portable batteries, and associated apparatus. For purposes of clarity, detailed descriptions of functions, components, and systems familiar to those skilled in the applicable arts are not included. The methods and apparatus of the disclosure provide one or more advantages including, but not limited to, portable energy and high efficiency passive charging of devices. While the disclosure has been described with reference to certain illustrative examples, those described herein are not intended to be construed in a limiting sense. For example, variations or combinations of steps or materials in the examples shown and described may be used in particular cases while not departing from the disclosure. Various modifications and combinations of the illustrative examples as well as other advantages and examples will be apparent to persons skilled in the arts upon reference to the drawings, description, and claims.

What is claimed is:

1. A system comprising:
    at least one first antenna configured to receive or transmit at least one electromagnetic signal from or to a second antenna;
    at least one variable circuit having at least one non-variable circuit component operatively coupled to the antenna, wherein the variable circuit is configured to modify the electromagnetic signal by modifying a parameter of the first antenna; and
    at least one dynamic adjustment circuit operatively coupled to the circuit component, wherein the variable circuit is configured to adjust an impedance value in response to the dynamic adjustment circuit, and the dynamic adjustment circuit is configured to determine a power transfer efficiency of the first antenna with the second antenna by measuring a signal across the at least one non-variable circuit component.

2. The system of claim 1 wherein the variable circuit comprises a variable capacitor, a variable inductor, a variable resistor, a variable antenna configuration, or combinations thereof.

3. The system of claim 2 wherein the variable circuit comprises the variable antenna configuration, wherein the variable antenna configuration comprises at least one adjustable inductance antenna.

4. The system of claim 2 wherein the variable circuit comprises the variable antenna configuration, wherein the variable antenna configuration comprises a plurality of switchable antennas comprising at least two shapes.

5. The system of claim 2 wherein the variable circuit comprises the variable antenna configuration, wherein the variable antenna configuration comprises a one or more switchable antennas selected from the group consisting of series switchable antennas and parallel switchable antennas.

6. The system of claim 2 wherein the variable circuit comprises the variable antenna configuration, wherein the variable antenna configuration comprises a plurality of switchable antennas.

7. The system of claim 2 wherein the variable circuit comprises the variable antenna configuration, wherein the variable antenna configuration comprises a dynamically steerable antenna.

8. The system of claim 1 further comprises a communication link associated with a first dynamic adjustment circuit, a second dynamic adjustment circuit, and intermediate dynamic adjustment circuit and configured to receive a communication signal that is separate and distinct from the electromagnetic signal.

9. The system of claim 1 wherein the variable circuit comprises at least one variable load, wherein the variable load comprises a resistive load, a complex load, or a combination thereof.

10. The system of claim 1 wherein the variable circuit is connected in a parallel configuration, a series configuration, or a parallel and series combination configuration.

11. The system of claim 1 wherein the variable circuit is configured to modify the amplitude of the electromagnetic signal and the frequency of the electromagnetic signal.

12. The system of claim 1 further comprising:
    a first system having an intermediate antenna, the first system generating the electromagnetic signal; and
    a second system having the secondary antenna and a load.

13. The resonant circuit dynamic optimization system of claim 1 further comprising:
    a first system having an intermediate-antenna, the first system having a driver to generate the electromagnetic signal; and
    a second system having the secondary antenna and a load.

14. The system of claim 1 wherein the dynamic adjustment circuit is configured to determine a power transfer efficiency of the electromagnetic signal as a function of the at least one antenna, an intermediate antenna associated with a first system and the secondary antenna associated with a second system, wherein the electromagnetic signal is a wireless power signal that is transmitted from the at least one antenna to the secondary antenna and the power transfer efficiency is modified by the intermediate antenna and the first system.

15. The system of claim 1 further comprising at least one rectifier operatively coupled to the dynamic adjustment circuit, wherein the dynamic adjustment circuit is configured to determine a power transfer efficiency of the first antenna with the second antenna by measuring a signal across the at least one circuit component operatively coupled to the first antenna configured to receive at least one electromagnetic signal from a second antenna.

16. The system of claim 1 further comprising at least one power capacitor operatively coupled to the dynamic adjustment circuit.

17. The system of claim 1 further comprising at least one power conditioner operatively coupled to the dynamic adjustment circuit.

18. A system comprising:
- an intermediate antenna configured to receive or transmit at least one electromagnetic signal;
- an intermediate variable circuit component operatively coupled to the intermediate antenna, wherein the intermediate variable circuit component is configured to modify the electromagnetic signal;
- an intermediate dynamic adjustment circuit operatively coupled to the intermediate variable circuit component, wherein the intermediate variable circuit component is configured to be responsive to the intermediate dynamic adjustment circuit;
- at least one secondary antenna configured to receive or transmit the electromagnetic signal;
- a secondary variable circuit component operatively coupled to the secondary antenna, wherein the secondary variable circuit component is configured to modify the electromagnetic signal between the intermediate antenna and the secondary antenna; and
- a secondary dynamic adjustment circuit operatively coupled in parallel to the secondary variable circuit component, wherein the secondary variable circuit component is configured to be responsive to the secondary intermediate dynamic adjustment circuit.

19. A method comprising:
(a) receiving at least one electromagnetic signal;
(b) determining a parameter of the electromagnetic signal from a first antenna to a second antenna with a dynamic adjustment circuit based on a signal developed across a non-variable circuit element of a variable circuit; and
(c) modifying the parameter of the electromagnetic signal with at least one variable circuit component by changing a parameter of one or more of the first antenna and the second antenna.

20. The method of claim 19 wherein the determining is at least partially based upon the intermediate communication signal.

* * * * *